US012570859B2

(12) United States Patent
Hasebe et al.

(10) Patent No.: US 12,570,859 B2
(45) Date of Patent: Mar. 10, 2026

(54) PRIMER, PRINTING SET, PRINTING METHOD, AND PRINTING APPARATUS

(71) Applicants: Daiki Hasebe, Tokyo (JP); Yuta Nakamura, Kanagawa (JP); Tomohiro Nakagawa, Kanagawa (JP); Daiki Hyakutake, Kanagawa (JP); Hikaru Ishii, Kanagawa (JP)

(72) Inventors: Daiki Hasebe, Tokyo (JP); Yuta Nakamura, Kanagawa (JP); Tomohiro Nakagawa, Kanagawa (JP); Daiki Hyakutake, Kanagawa (JP); Hikaru Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 178 days.

(21) Appl. No.: 18/347,668

(22) Filed: Jul. 6, 2023

(65) Prior Publication Data

US 2024/0010844 A1 Jan. 11, 2024

(30) Foreign Application Priority Data

Jul. 7, 2022 (JP) ................................. 2022-109681
May 19, 2023 (JP) ................................. 2023-082685

(51) Int. Cl.
| | |
|---|---|
| *C09D 11/54* | (2014.01) |
| *B41J 2/17* | (2006.01) |
| *B41M 5/00* | (2006.01) |
| *B41M 5/36* | (2006.01) |
| *C09D 5/00* | (2006.01) |
| *C09D 7/20* | (2018.01) |
| *C09D 7/61* | (2018.01) |
| *C09D 11/102* | (2014.01) |
| *C09D 11/322* | (2014.01) |
| *C09D 11/38* | (2014.01) |
| *C09D 11/40* | (2014.01) |

(52) U.S. Cl.
CPC ................ *C09D 5/002* (2013.01); *B41J 2/17* (2013.01); *B41M 5/0017* (2013.01); *B41M 5/36* (2013.01); *C09D 7/20* (2018.01); *C09D 7/61* (2018.01); *C09D 11/102* (2013.01); *C09D 11/322* (2013.01); *C09D 11/38* (2013.01); *C09D 11/40* (2013.01); *C09D 11/54* (2013.01)

(58) Field of Classification Search
CPC . C09D 5/002; C09D 7/20; C09D 7/61; C09D 11/102; C09D 11/322; C09D 11/38; C09D 11/40; C09D 11/54; B41J 2/17; B41M 5/36; B41M 5/0017
See application file for complete search history.

(56) References Cited

U.S. PATENT DOCUMENTS

2015/0054883 A1* 2/2015 Okuda ................... C09D 11/40
524/556
2020/0399496 A1 12/2020 Nonaka et al.
(Continued)

FOREIGN PATENT DOCUMENTS

| | | |
|---|---|---|
| JP | 2016-190458 | 11/2016 |
| JP | 2017-043727 | 3/2017 |

(Continued)

*Primary Examiner* — Yaovi M Ameh
(74) *Attorney, Agent, or Firm* — Grüneberg Global IP, PLLC

(57) ABSTRACT

A primer is provided that includes water, a cationic resin, a polyvalent metal salt, and a diethylene glycol alkyl ether-based organic solvent.

20 Claims, 1 Drawing Sheet

(56) References Cited

U.S. PATENT DOCUMENTS

| 2021/0170779 | A1 * | 6/2021 | Asakawa | ............. C09D 11/033 |
|---|---|---|---|---|
| 2023/0183501 | A1 | 6/2023 | Hasegawa et al. | |

FOREIGN PATENT DOCUMENTS

| JP | 2017-137461 | | 8/2017 | |
|---|---|---|---|---|
| JP | 2018-094902 | | 6/2018 | |
| JP | 2018-122588 | | 8/2018 | |
| JP | 2019019315 A | * | 2/2019 | ............. C09D 11/54 |
| JP | 2019-172820 | | 10/2019 | |
| JP | 2020-152016 | | 9/2020 | |
| JP | 2021-000790 | | 1/2021 | |
| JP | 2021088096 A | * | 6/2021 | ............. B41M 5/00 |
| JP | 2021-120219 | | 8/2021 | |
| WO | WO2017/154683 A1 | | 9/2017 | |

* cited by examiner

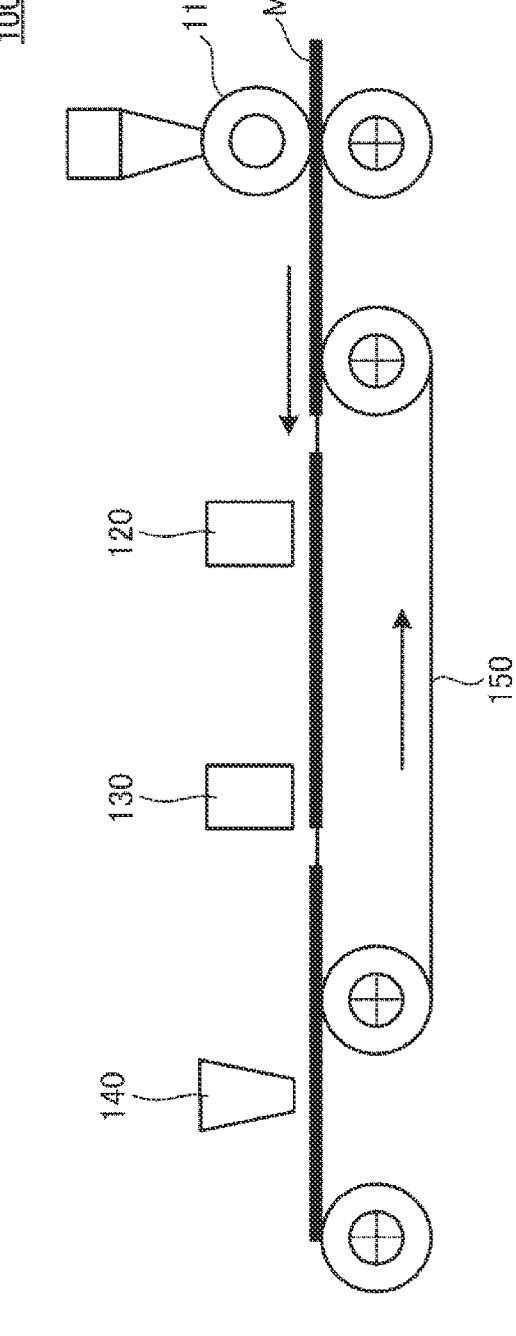

PRIMER, PRINTING SET, PRINTING METHOD, AND PRINTING APPARATUS

CROSS-REFERENCE TO RELATED APPLICATIONS

This patent application is based on and claims priority pursuant to 35 U.S.C. § 119(a) to Japanese Patent Application Nos. 2022-109681 and 2023-082685, filed on Jul. 7, 2022, and May 19, 2023, respectively, in the Japan Patent Office, the entire disclosure of each of which is hereby incorporated by reference herein.

BACKGROUND

Technical Field

The present disclosure relates to a primer, a printing set, a printing method, and a printing apparatus.

Related Art

In recent years, as the speed of printers is increasing, it is expected that image quality deterioration such as image unevenness occurs, due to the occurrence of beading and the like when ink is not sufficiently dried. Therefore, there is a desire to provide a new primer that suppresses the occurrence of beading and achieves both high productivity and high image quality.

SUMMARY

A primer according to an embodiment of the present invention includes water, a cationic resin, a polyvalent metal salt, and a diethylene glycol alkyl ether-based organic solvent.

BRIEF DESCRIPTION OF THE DRAWING

A more complete appreciation of embodiments of the present disclosure and many of the attendant advantages and features thereof can be readily obtained and understood from the following detailed description with reference to the accompanying drawing, wherein:

the drawing is a schematic view of a printing apparatus according to an embodiment of the present invention used in a printing method according to an embodiment of the present invention.

The accompanying drawing is intended to depict embodiments of the present disclosure and should not be interpreted to limit the scope thereof. The accompanying drawing is not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to an embodiment of the present invention, a primer is provided that suppresses the occurrence of beading and obtains an image having excellent glossiness, adhesion, and ethanol resistance.

(Primer)

A primer according to the present embodiment contains water, a cationic resin, a polyvalent metal salt, and a diethylene glycol alkyl ether-based organic solvent, and may contain other components if desired. In the present embodiment, the "primer" may be referred to as a "treatment liquid", a "pretreatment liquid", a "composition liquid", a "reaction liquid", and a "liquid composition".

In a related art, a liquid composition for surface treatment contains nonionic resin particles and does not contain a diethylene glycol alkyl ether-based organic solvent. In a related art, a reaction liquid does not include a combination of a diethylene glycol alkyl ether-based organic solvent and a cationic resin.

Therefore, in techniques of the related art, when a primer is printed by inkjet on a non-permeable recording medium, the ethanol resistance of the image may decrease.

In the present embodiment, by using a primer containing water, a cationic resin, a polyvalent metal salt, and a diethylene glycol alkyl ether-based organic solvent, the diethylene glycol alkyl ether-based organic solvent causes the non-permeable recording medium to swell, and the organic solvent permeates into the non-permeable recording medium. This increases the concentration of a solute component in the primer and improves a drying speed of the primer. When the drying speed of the primer is improved, it is possible to suppress unintentional coalescence of adjacent ink dots discharged into a region where the primer is applied, so that beading of the ink image is prevented. The primer of the present embodiment contains both the cationic resin and the polyvalent metal salt, and thus, the ethanol resistance of the ink image is improved. Improving the ethanol resistance of the ink image is advantageous in preventing image degradation during cleaning, polishing, and disinfecting an image surface with ethanol, which is often performed when displaying a printed object.

<Water>

Examples of types of water include, but are not limited to, pure water such as ion-exchanged water, ultrafiltration water, reverse osmosis water, and distilled water, or ultra-pure water.

The content of water is not particularly limited and may be appropriately selected according to a purpose, but is preferably 10% by mass or more and 80% by mass or less, and more preferably 30% by mass or more and 60% by mass or less, with respect to the total amount of the primer, from the viewpoint of drying properties and discharge reliability of the primer.

<Organic Solvent>

The primer of the present embodiment contains a diethylene glycol alkyl ether-based organic solvent as the organic solvent.

Examples of the diethylene glycol alkyl ether-based organic solvent include, but are not limited to, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, diethylene glycol dimethyl ether, diethylene glycol diethyl ether, diethylene glycol dibutyl ether, diethylene glycol ethyl methyl ether, diethylene glycol isopropyl methyl ether, and diethylene glycol butyl methyl ether. Among the organic solvents, diethylene glycol diethyl ether is particularly preferable from the viewpoint of beading prevention, glossiness, and ethanol resistance of the obtained image. Each of these organic solvents can be used alone or in combination with others.

A content of the diethylene glycol alkyl ether-based organic solvent is preferably 5.0% by mass or more and 30.0% by mass or less, and more preferably 15.0% by mass or more and 30.0% by mass or less, with respect to the total amount of the primer.

If the content of the diethylene glycol alkyl ether-based organic solvent is 5.0% by mass or more and 30.0% by mass or less with respect to the total amount of the primer, it is possible to prevent beading of the obtained image, and improve glossiness, adhesion, and ethanol resistance.

In the primer of the present embodiment, other organic solvents can be used in combination with the diethylene glycol alkyl ether-based organic solvent.

Examples of the organic solvent that can be used in combination include, but are not limited to, polyhydric alcohols, ethers such as polyhydric alcohol alkyl ethers and polyhydric alcohol aryl ethers, nitrogen-containing heterocyclic compounds, amides, amines, sulfur-containing compounds, and other organic solvents. These organic solvents can be used alone or in combination with others.

Examples of the polyhydric alcohols include, but are not limited to, ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Examples of the polyhydric alcohol alkyl ethers include, but are not limited to, ethylene glycol monoethyl ether, ethylene glycol monobutyl ether, tetraethylene glycol monomethyl ether, and propylene glycol monoethyl ether.

Examples of the polyhydric alcohol aryl ethers include, but are not limited to, ethylene glycol monophenyl ether and ethylene glycol monobenzyl ether.

Examples of the nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

Examples of the amides include, but are not limited to, formamide, N-methylformamide, N,N-dimethylformamide, 3-methoxy-N,N-dimethylpropionamide, and 3-butoxy-N,N-dimethylpropionamide.

Examples of the amines include, but are not limited to, monoethanolamine, diethanolamine, and triethylamine.

Examples of the sulfur-containing compounds include, but are not limited to, dimethylsulfoxide, sulfolane, and thiodiethanol.

Examples of other organic solvents include, but are not limited to, propylene carbonate and ethylene carbonate.

A content of the organic solvent is not particularly limited and may be appropriately selected according to a purpose, but is preferably 10% by mass or more and 60% by mass or less, and more preferably 20% by mass or more and 60% by mass or less, with respect to the total amount of the primer, from the viewpoint of drying properties and discharge reliability of the primer.

<Polyvalent Metal Salt>

The polyvalent metal salt includes carboxylate ions or nitrate ions that bind to polyvalent metal ions having a valence of two or more, and the polyvalent metal salt is preferably soluble in water.

Examples of the polyvalent metal ions include, but are not limited to, divalent metal ions such as $Ca^{2+}$, $Cu^{2+}$, $Ni^{2+}$, $Mg^{2+}$, $Zn^{2+}$, and $Ba^{2+}$, and trivalent metal ions such as $Al^{3+}$, $Fe^{3+}$, and $Cr^{3+}$.

Preferred examples of the carboxylate ions are saturated aliphatic monocarboxylic acids. Examples of the saturated aliphatic monocarboxylic acids include, but are not limited to, formic acid, acetic acid, propionic acid, butyric acid, isobutyric acid, valeric acid, isovaleric acid, pivalic acid, and hexanoic acid. Each of these acids can be used alone or in combination with others.

Examples of the polyvalent metal salt include, but are not limited to, calcium carbonate, calcium nitrate, calcium chloride, calcium acetate, calcium sulfate, magnesium chloride, magnesium acetate, magnesium nitrate, magnesium sulfate, barium sulfate, zinc sulfide, zinc carbonate, aluminum chloride, and aluminum nitrate, or anhydrides or hydrates thereof. Among the polyvalent metal salts, magnesium acetate is preferable from the viewpoint of improving the glossiness, adhesion, and ethanol resistance of the obtained image. Each of these polyvalent metal salts can be used alone or in combination with others.

A content of the polyvalent metal salt is preferably 0.25% by mass or more and 10.0% by mass or less, more preferably 0.5% by mass or more and 10.0% by mass or less, and further preferably 2.0% by mass or more and 5.0% by mass or less, with respect to the total amount of the primer.

If the content of the polyvalent metal salt with respect to the total amount of the primer is 0.25% by mass or more and 10.0% by mass or less, the adhesion, glossiness, and ethanol resistance of the obtained image are improved.

<Cationic Resin>

The cationic resin imparts high image gloss and scratch resistance.

The cationic resin is a resin having a cationic substituent. Examples of the cationic resin include, but are not limited to, cationic urethane-based resins, cationic olefin-based resins, and cationic allylamine-based resins.

The cationic resin may be appropriately synthesized or may be a commercially available product.

Commercially available products of the cationic resin include, but are not limited to, those under the trade names of SUPERFLEX 600, SUPERFLEX 610, SUPERFLEX 620, SUPERFLEX 630, SUPERFLEX 640, and SUPERFLEX 650 (non-yellowing isocyanate ester type) (all manufactured by Daiichi Kogyo Seiyaku Co., Ltd.); HYDRAN CP-7010, HYDRAN CP-7020, HYDRAN CP-7030, HYDRAN CP-7040, HYDRAN CP-7050, HYDRAN CP-7060, and HYDRAN CP-7610 (all manufactured by DIC Corporation); and aqueous urethane dispersion WBR-2120C and aqueous urethane dispersionWBR-2122C (both manufactured by Taisei Fine Chemical Co., Ltd.). Each of these can be used alone or in combination with others.

The primer is preferably obtained by mixing a material such as an organic solvent with the cationic resin in a state of a resin emulsion in which the cationic resin is dispersed using water as a dispersion medium. Considering the easiness of the work of preparing water-based ink by blending a cationic resin with an organic solvent and water, and the aim of dispersing the cationic resin as uniformly as possible in the primer, it is preferable to add the resin particles to the primer in a state of a resin emulsion in which the resin particles are stably dispersed by using water as a dispersion medium.

The cationic resin is easily formed into a film by dissolving the cationic resin in the organic solvent added to the primer. The film formation of the resin particles is promoted as the organic solvent and the water contained in the primer evaporate.

When the cationic resin is dispersed by using water as the dispersion medium, examples of the resin particles include, but are not limited to, forced emulsification-type resin particles utilizing a dispersant and so-called self-emulsifying resin particles having a cationic group in the molecular structure. Among these types of resin particles, the self-emulsifying resin particles having a cationic group in the molecular structure are preferred from the viewpoint of increasing the strength of printed objects.

A content of the cationic resin is preferably 2.0% by mass or more and 15.0% by mass or less, and more preferably 7.0% by mass or more and 12.0% by mass or less with respect to the total amount of the primer.

When the content of the cationic resin with respect to the total amount of the primer is 2.0% by mass or more and 15.0% by mass or less, the glossiness and the ethanol resistance of the obtained image are improved.

<Other Components>

Other components are not particularly limited and may be appropriately selected according to a purpose. Examples thereof include, but are not limited to, a surfactant, a preservative/antifungal agent, a defoaming agent, a rust inhibitor, and a pH adjuster.

—Surfactant—

The surfactant is not particularly limited and may be appropriately selected according to a purpose. Examples of the surfactant include, but are not limited to, a compound having a hydrophilic group or a hydrophilic polymer chain in a side chain of a compound (silicone compound) having a polysiloxane structure such as polydimethylsiloxane, and a compound having a hydrophilic group or a hydrophilic polymer chain at an end of a compound (silicone compound) having a polysiloxane structure such as polydimethylsiloxane. The "compound having a polysiloxane structure" also includes a polysiloxane surfactant, as long as a structure of the surfactant includes a polysiloxane structure.

Examples of the hydrophilic group or the hydrophilic polymer chain include, but are not limited to, polyether groups (such as polyethylene oxide, polypropylene oxide, and copolymers thereof), polyglycerin (such as $C_3H_6O$ $(CH_2CH(OH)CH_2O)_n$—H), pyrrolidone, betaines (such as $C_3H_6N^+(C_2H_4)_2$—$CH_2COO$—), sulfates (such as $C_3H_6O$ $(C_2H_4O)_n$—$SO_3Na$), phosphates (such as $C_3H_6O(C_2$ $H_4O)_n$—$P(=O)OHONa$), and quaternary salts (such as $C_3H_6N^+(C_2H_4)_3Cl^-$). In the chemical formulas mentioned above, n represents an integer of 1 or more. Among the above-described compounds, a compound having a polyether group is preferred.

Other suitable examples include, but are not limited to, a vinyl-based copolymer including a silicone-based compound such as polydimethylsiloxane in a side chain, the vinyl-based copolymer being obtained by copolymerization of polydimethylsiloxane or the like having a polymerizable vinyl group at an end, and another copolymerizable monomer (at least a part of the monomer preferably includes a hydrophilic monomer such as (meth)acrylic acid or a salt thereof).

Among these compounds, a compound having a polysiloxane structure and a hydrophilic polymer chain is preferable, a compound containing a polyether group as the hydrophilic polymer chain is more preferable, and a non-ionic surfactant in which the polysiloxane surfactant includes methylpolysiloxane as a hydrophobic group and a polyoxyethylene structure as a hydrophilic group is particularly preferable.

Examples of the polysiloxane surfactant include, but are not limited to, polyether-modified silicones and silicone compounds containing polyoxyalkylene groups.

Commercially available products can be used as the polysiloxane surfactant. Examples of the commercially available products include those under the trade names of SILFACE SAG503A, SILFACE SAG005, and SILFACE SAG008 (all manufactured by Nissin Chemical Co., Ltd.); FZ2110, FZ2166, SH-3772M, L7001, and SH-3773M (all manufactured by Dow Toray Co., Ltd.); KF-353, KF-945, and KF-6017 (all manufactured by Shin-Etsu Chemical Co., Ltd.); and FOAM BAN MS-575 (manufactured by Ultra Addives Inc.). Each of these can be used alone or in combination with others.

A content of the surfactant is preferably 0.1% by mass or more and 4% by mass or less, and more preferably 1% by mass or more and 2% by mass or less, with respect to the total amount of the primer. When the content of the surfactant with respect to the total amount of the primer is 0.1% by mass or more and 4% by mass or less, the combined use of the surfactant and the diethylene glycol alkyl ether-based organic solvent can improve the fixability of the ink to a non-permeable recording medium, and further, also improve the image quality such as glossiness.

—Defoaming Agent—

The defoaming agent is not particularly limited, and examples of the defoaming agent include, but are not limited to, silicone-based defoaming agents, polyether-based defoaming agents, and fatty acid ester-based defoaming agents. Among these defoaming agents, silicone-based defoaming agents have excellent defoaming ability, and thus are preferred. Each of these defoaming agents can be used alone or in combination with others.

—Preservative/Antifungal Agent—

The preservative/antifungal agent is not particularly limited, and an example thereof includes, but is not limited to, 1,2-benzisothiazolin-3-one.

—Rust Inhibitor—

The rust inhibitor is not particularly limited, and examples thereof include, but are not limited to, acidic sulfites and sodium thiosulfate.

—pH Adjuster—

The pH adjuster is not particularly limited as long as the pH adjuster adjusts the pH to 7 or higher. Examples of the pH adjuster include, but are not limited to, amines such as diethanolamine and triethanolamine.

The primer of the present embodiment may be prepared by mixing water, a cationic resin, a polyvalent metal salt, a diethylene glycol alkyl ether-based organic solvent, and other components if desired, and the components may be stirred and mixed to prepare the primer if desired. For example, a stirrer having stirring blades, a magnetic stirrer, a high-speed disperser, or the like may be used to stir and mix the components.

—Physical Properties of Primer—

The physical properties of the primer are not particularly limited and may be appropriately selected according to a purpose. For example, the viscosity, pH, and the like are preferably within the following ranges.

The viscosity of the primer at 25° C. is preferably 5 mPa s or more and 20 mPa s or less, and more preferably 5 mPa s or more and 15 mPa s or less, from the viewpoint of obtaining good discharge properties.

Here, the viscosity can be measured using a rotational viscometer (RE-550L, manufactured by TOKI SANGYO). Regarding the measurement conditions, the viscosity may be measured at 25° C. with a standard cone rotor (1° 34'×R24), a sample liquid amount of 1.2 mL, a rotation speed of 50 rpm, and a measurement time of 3 minutes.

The pH of the primer is preferably from 7 to 12, and more preferably from 8 to 11, from the viewpoint of preventing corrosion of metal members in contact with the liquid.

The diethylene glycol alkyl ether-based organic solvent, the cationic resin, the polyvalent metal salt, and other components contained in the primer of the present embodiment may be qualitatively and quantitatively measured by gas chromatography mass spectrometry (GC-MS), for example. An example of a measurement apparatus used for gas chromatography-mass spectrometry (GC-MS) includes, but is not limited to, GCMS-QP2020NX (manufactured by Shimadzu Corporation). The amount of water contained in the primer may be measured by quantification of volatile components by gas chromatography-mass spectrometry (GC-MS), or mass variation by thermogravimetry-differential thermal analysis (TG-DTA), as general methods.

(Printing Set)

The printing set of the present embodiment includes the primer of the present embodiment and ink containing a color material and an organic solvent.

The printing set of the present embodiment can be suitably applied to various types of printing apparatuses employing an inkjet printing method, such as printers, facsimile machines, photocopiers, multifunction peripherals functioning as a printer/facsimile machine/photocopier, and three-dimensional object fabrication apparatuses.

<Ink>

The ink contains a color material and an organic solvent, and preferably contains water, a resin, and an additive, and contains other components if desired.

—Organic Solvent—

The organic solvent contained in the ink is not particularly limited, and for example, water-soluble organic solvents may be used. Examples of the organic solvent contained in the ink include, but are not limited to, polyhydric alcohols, ethers such as polyhydric alcohol alkyl ethers and polyhydric alcohol aryl ethers, nitrogen-containing heterocyclic compounds, amides, amines, sulfur-containing compounds, and other organic solvents.

Examples of the polyhydric alcohols include, but are not limited to, ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Examples of the polyhydric alcohol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ethers include, but are not limited to, ethylene glycol monophenyl ether and ethylene glycol monobenzyl ether.

Examples of the nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

Examples of the amides include, but are not limited to, formamide, N-methylformamide, N,N-dimethylformamide, 3-methoxy-N,N-dimethylpropionamide, and 3-butoxy-N,N-dimethylpropionamide.

Examples of the amines include, but are not limited to, monoethanolamine, diethanolamine, and triethylamine.

Examples of the sulfur-containing compounds include, but are not limited to, dimethylsulfoxide, sulfolane, and thiodiethanol.

Examples of the other organic solvents include, but are not limited to, propylene carbonate and ethylene carbonate.

Preferably, the organic solvent contained in the ink is an organic solvent having a boiling point of 250° C. or below, because such an organic solvent not only functions as a wetting agent, but also provides good drying properties.

Polyol compounds having 8 or more carbon atoms and glycol ether compounds may also be suitably used as the organic solvent contained in the ink. The polyol compounds having 8 or more carbon atoms and the glycol ether compounds improve the permeability of the ink, which is advantageous when paper is used as a recording medium.

Examples of the polyol compounds having 8 or more carbon atoms include, but are not limited to, 2-ethyl-1,3-hexanediol and 2,2,4-trimethyl-1,3-pentanediol.

Examples of the glycol ether compounds include, but are not limited to, polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenyl ether and ethylene glycol monobenzyl ether.

A content of the organic solvent in the ink is not particularly limited and may be appropriately selected according to a purpose, but is preferably 10% by mass or more and 60% by mass or less, and more preferably 20% by mass or more and 60% by mass or less, with respect to the total amount of ink, from the viewpoint of the drying properties and the discharge reliability of the ink.

—Color Material—

The color material is not particularly limited and may be appropriately selected according to a purpose. For example, pigments, pigment dispersions, and dyes can be used as the color material.

—Pigment—

The pigments include both inorganic pigments and organic pigments. Each of the pigments can be used alone or in combination with others. Mixed crystals may also be used as the pigments.

Examples of pigments that may be used include, but are not limited to, black pigments, yellow pigments, magenta pigments, cyan pigments, white pigments, green pigments, orange pigments, glossy pigments such as gold and silver, and metallic pigments.

Examples of the inorganic pigments that may be used include, but are not limited to, titanium oxide, iron oxide, calcium carbonate, barium sulfate, aluminum hydroxide, Barium Yellow, Cadmium Red, Chrome Yellow, and carbon blacks prepared by a known method such as a contact method, a furnace method, and a thermal method.

Examples of the organic pigments include, but are not limited to, azo pigments, polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (for example, basic dye chelates and acid dye chelates), nitro pigments, nitroso pigments, and aniline black.

Among these pigments, it is preferable to use pigments having good affinity with solvents such as organic solvents and water. In addition, it is also possible to use hollow resin particles or hollow inorganic particles.

Specific examples of pigments used for black color printing include, but are not limited to, carbon blacks (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1).

Specific examples of pigments used for color printing include, but are not limited to, C.I. Pigment Yellow 1, C.I. Pigment Yellow 3, C.I. Pigment Yellow 12, C.I. Pigment Yellow 13, C.I. Pigment Yellow 14, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxide), C.I. Pigment Yellow 53, C.I. Pigment Yellow 55, C.I. Pigment Yellow 74, C.I. Pigment Yellow 81, C.I. Pigment Yellow 83, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 108, C.I. Pigment Yellow 109, C.I. Pigment Yellow 110, C.I. Pigment Yellow 117, C.I. Pigment Yellow 120, C.I. Pigment Yellow 138, C.I. Pigment Yellow 150, C.I. Pigment Yellow 153, C.I. Pigment Yellow 155, C.I. Pigment Yellow 180, C.I. Pigment Yellow 185, C.I. Pigment Yellow 213; C.I. Pigment Orange 5, C.I. Pigment Orange 13, C.I. Pigment Orange 16, C.I. Pigment Orange 17, C.I. Pigment Orange 36, C.I. Pigment Orange 43, C.I. Pigment Orange 51; C.I. Pigment Red 1, C.I. Pigment Red 2, C.I. Pigment Red 3, C.I. Pigment Red 5, C.I. Pigment Red 17, C.I. Pigment Red 22, C.I. Pigment Red 23, C.I. Pigment Red 31, C.I. Pigment Red 38, C.I. Pigment Red 48:2 (Permanent Red 2B (Ca)), C.I. Pigment Red 48:3, C.I. Pigment Red 48:4, C.I. Pigment Red 49:1, C.I. Pigment Red 52:2, C.I. Pigment Red 53:1, C.I. Pigment Red 57:1 (Brilliant Carmine 6B), C.I. Pigment Red 60:1, C.I. Pigment Red 63:1, C.I. Pigment Red 63:2, C.I. Pigment Red 64:1, C.I. Pigment Red 81, C.I. Pigment Red 83, C.I. Pigment Red 88, C.I. Pigment Red 101 (Bengala), C.I. Pigment Red 104, C.I. Pigment Red 105, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 184, C.I. Pigment Red 185, C.I. Pigment Red 190, C.I. Pigment Red 193, C.I. Pigment Red 202, C.I. Pigment Red 207, C.I. Pigment Red 208, C.I. Pigment Red 209, C.I. Pigment Red 213, C.I. Pigment Red 219, C.I. Pigment Red 224, C.I. Pigment Red 254, C.I. Pigment Red 264; C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23, C.I. Pigment Violet 38; C.I. Pigment Blue 1, C.I. Pigment Blue 2, C.I. Pigment Blue 15 (Phthalocyanine Blue), C.I. Pigment Blue 15:1, C.I. Pigment Blue 15:2, C.I. Pigment Blue 15:3, C.I.

Pigment Blue 15:4 (Phthalocyanine Blue), C.I. Pigment Blue 16, C.I. Pigment Blue 17:1, C.I. Pigment Blue 56, C.I. Pigment Blue 60, C.I. Pigment Blue 63; and C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18, C.I. Pigment Green 36.

Specific examples of pigments used for black color printing include, but are not limited to, titanium oxide, iron oxide, calcium carbonate, barium sulfate, and aluminum hydroxide.

—Pigment Dispersion—

The pigment dispersion may be obtained by mixing water, an organic solvent, a pigment, a pigment dispersant, and other components if desired, to disperse the pigment, and adjusting the particle diameter of the pigment.

A method of dispersing the pigment to prepare the pigment dispersion is not particularly limited and may be appropriately selected from known methods. Examples of the method include, but are not limited to, a method of preparing a pigment dispersion by mixing the pigment with materials such as water and an organic solvent, a method of preparing a pigment dispersion by mixing the pigment and a pigment dispersion obtained by mixing the pigment with materials such as water and a pigment dispersant, with materials such as water and an organic solvent.

Preferably, a disperser is used for dispersing the pigment.

It is preferable to filter the pigment dispersion by using a filter or a centrifugal separator to remove coarse particles, followed by degassing of the pigment dispersion, if desired.

The particle diameter of the pigment in the pigment dispersion is not particularly limited and may be appropriately selected according to a purpose. However, from the viewpoint of improving the dispersion stability of the pigment and enhancing the discharge stability and the image quality such as the image density, the maximum frequency of the particle diameter of the pigments in the pigment dispersion obtained by maximum number conversion is preferably 20 nm or more and 500 nm or less, and more preferably 20 nm or more and 150 nm or less.

The particle diameter of the pigment in the pigment dispersion may be measured by using a particle size analyzer (NANOTRAC WAVE-UT151, manufactured by Microtrac-BEL Corp.).

A content of the pigment in the pigment dispersion is not particularly limited and may be appropriately selected according to a purpose, but is preferably 0.1% by mass or more and 60% by mass or less, and more preferably 0.1% by mass or more and 50% by mass or less, from the viewpoint of achieving a good discharge stability and increasing the image density.

—Dye—

The dye is not particularly limited and may be appropriately selected according to a purpose. Examples of the dye include, but are not limited to, acid dyes, direct dyes, reactive dyes, and basic dyes. Each of these dyes can be used alone or in combination with others.

Specific examples of the dye include, but are not limited to, C.I. Acid Yellow 17, C.I. Acid Yellow 23, C.I. Acid Yellow 42, C.I. Acid Yellow 44, C.I. Acid Yellow 79, C.I. Acid Yellow 142; C.I. Acid Red 52, C.I. Acid Red 80, C.I. Acid Red 82, C.I. Acid Red 249, C.I. Acid Red 254, C.I. Acid Red 289; C.I. Acid Blue 9, C.I. Acid Blue 45, C.I. Acid Blue 249; C.I. Acid Black 1, C.I. Acid Black 2, C.I. Acid Black 24, C.I. Acid Black 94; C.I. Food Black 1, C.I. Food Black 2; C.I. Direct Yellow 1, C.I. Direct Yellow 12, C.I. Direct Yellow 24, C.I. Direct Yellow 33, C.I. Direct Yellow 50, C.I. Direct Yellow 55, C.I. Direct Yellow 58, C.I. Direct Yellow 86, C.I. Direct Yellow 132, C.I. Direct Yellow 142, C.I. Direct Yellow 144, C.I. Direct Yellow 173; C.I. Direct Red 1, C.I. Direct Red 4, C.I. Direct Red 9, C.I. Direct Red 80, C.I. Direct Red 81, C.I. Direct Red 225, C.I. Direct Red 227; C.I. Direct Blue 1, C.I. Direct Blue 2, C.I. Direct Blue 15, C.I. Direct Blue 71, C.I. Direct Blue 86, C.I. Direct Blue 87, C.I. Direct Blue 98, C.I. Direct Blue 165, C.I. Direct Blue 199, C.I. Direct Blue 202; C.I. Direct Black 19, C.I. Direct Black 38, C.I. Direct Black 51, C.I. Direct Black 71, C.I. Direct Black 154, C.I. Direct Black 168, C.I. Direct Black 171, C.I. Direct Black 195; C.I. Reactive Red 14, C.I. Reactive Red 32, C.I. Reactive Red 55, C.I. Reactive Red 79, C.I. Reactive Red 249; and C.I. Reactive Black 3, C.I. Reactive Black 4, C.I. Reactive Black 35.

A content of the dye is not particularly limited and may be appropriately selected according to a purpose, but is preferably 0.1% by mass or more and 15% by mass or less, and more preferably 1% by mass or more and 10% by mass or less, with respect to the total amount of ink, from the viewpoint of good fixability, color development, and discharge stability.

A method of dispersing the pigment to obtain ink is not particularly limited and may be appropriately selected according to a purpose. Examples of the method include, but are not limited to, a method of introducing a hydrophilic functional group into a pigment to obtain a self-dispersing pigment, a method of coating the surface of a pigment with a resin to disperse the pigment, and a method of dispersing a pigment by using a dispersant.

Examples of the method of introducing a hydrophilic functional group into a pigment to obtain a self-dispersing pigment include, but are not limited to, a method of adding a functional group such as a sulfone group and a carboxyl group to a pigment (for example, carbon) to obtain a pigment that is dispersible in water.

Examples of the method of coating the surface of a pigment with a resin to disperse the pigment include, but are not limited to, a method of encapsulating the pigment in a microcapsule to obtain a pigment that is dispersible in water. Such a pigment may be referred to as a resin-coated pigment. In this case, it is not required that all pigments blended in the ink are coated with the resin, and the pigments dispersed in the ink may include pigments that are not coated with the resin and pigments that are partially coated with the resin, as long as the effects of the present embodiment are not impaired.

Examples of the method of dispersing a pigment by using a dispersant include, but are not limited to, a method of dispersing a pigment by using a known low-molecular dispersant represented by a surfactant and a method of dispersing a pigment by using a known high-molecular dispersant.

The dispersant is not particularly limited and may be appropriately selected according to the pigment. For example, anionic surfactants, cationic surfactants, amphoteric surfactants, and nonionic surfactants may be used as the dispersant. Each of these dispersants can be used alone or in combination with others.

The dispersant may be appropriately synthesized or may be a commercially available product. An example of commercially available dispersants includes, but is not limited to, the dispersant having the trade name NEWKALGEN D-1203 (a nonionic surfactant, manufactured by Takemoto Oil & Fat Co., Ltd.). Sodium naphthalenesulfonate formalin condensate may also be suitably used as the dispersant.

—Water—

Examples of types of water contained in the ink include, but are not limited to, pure water such as ion-exchanged water, ultrafiltration water, reverse osmosis water, and distilled water, or ultrapure water.

The water content in the ink is not particularly limited and may be appropriately selected according to a purpose, but is preferably 10% by mass or more and 90% by mass or less, and more preferably 20% by mass or more and 60% by mass or less, with respect to the total amount of the ink, from the viewpoint of the drying properties and discharge reliability of the ink.

—Resin—

The type of the resin contained in the ink is not particularly limited and can be appropriately selected according to a purpose. Specific examples of the resin include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins. Resin particles formed of these resins may also be used.

The ink can be obtained by mixing a resin emulsion in which the resin particles are dispersed in water as a dispersion medium, with materials such as a color material or an organic solvent.

These resin particles may be appropriately synthesized or may be commercially available products.

The volume average particle diameter of the resin particles contained in the ink is not particularly limited and may be appropriately selected according to a purpose, but is preferably from 10 nm to 1,000 nm, more preferably from 10 nm to 200 nm, and particularly preferably from 10 nm to 100 nm, from the viewpoint of achieving good fixability and high image hardness.

A content of the resin contained in the ink is not particularly limited and may be appropriately selected according to a purpose, but is preferably 1% by mass or more and 30% by mass or less, and more preferably 5% by mass or more and 20% by mass or less, with respect to the total amount of ink, from the viewpoint of fixability and storage stability of the ink.

The particle diameter of solid contents in the ink is not particularly limited and may be appropriately selected according to a purpose, but the maximum frequency of the particle diameter obtained by maximum number conversion is preferably 20 nm to 1,000 nm, and more preferably 20 nm to 150 nm, from the viewpoint of enhancing the discharge stability and the image quality such as the image density.

The solid contents include the resin particles and the pigment particles. For example, the volume average particle diameter and the maximum frequency obtained by maximum number conversion can be measured by using a particle size analyzer (MICROTRAC MODEL UPA9340, manufactured by Nikkiso Co., Ltd.).

—Additive—

The ink may contain a surfactant, a defoaming agent, a preservative/antifungal agent, a rust inhibitor, and a pH adjuster, if desired.

—Surfactant—

Surfactants that may be contained in the ink include silicone-based surfactants, fluorine-based surfactants, amphoteric surfactants, and nonionic surfactants.

The silicone-based surfactants are not particularly limited and may be appropriately selected according to a purpose. Among the silicone-based surfactants, silicone-based surfactants that do not decompose even at a high pH are preferred. Examples of the silicone-based surfactants include, but are not limited to, polydimethylsiloxane modified in a side chain, polydimethylsiloxane modified at both ends, polydimethylsiloxane modified at one end, and polydimethylsiloxane modified in a side chain and at both ends. In particular, silicone-based surfactants including a polyoxyethylene group and/or a polyoxyethylene polyoxypropylene group as the modifying group are more preferred, because such surfactants improve hydrophilicity and enhance water solubility. Examples of the silicone-based surfactants further include, but are not limited to, polyether-modified silicone-based surfactants such as a compound in which a polyalkylene oxide structure is introduced into a side chain of a Si-part in dimethylsiloxane.

As the fluorine-based surfactants, perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds having a perfluoroalkyl ether group in a side chain are particularly preferable, because these compounds have weak foamability. Examples of the perfluoroalkyl sulfonic acid compounds include, but are not limited to, perfluoroalkyl sulfonic acid and perfluoroalkyl sulfonate. Examples of the perfluoroalkyl carboxylic acid compounds include, but are not limited to, perfluoroalkyl carboxylic acid and perfluoroalkyl carboxylate. Examples of the polyoxyalkylene ether polymer compounds having a perfluoroalkyl ether group in a side chain include, but are not limited to, a sulfuric ester salt of a polyoxyalkylene ether polymer having a perfluoroalkyl ether group in a side chain, and a salt of a polyoxyalkylene ether polymer having a perfluoroalkyl ether group in a side chain. Examples of counter ions for the salts in these fluorine-based surfactants include, but are not limited to, Li, Na, K, $NH_4$, $NH_3CH_2CH_2OH$, $NH_2$ $(CH_2CH_2OH)_2$, and $NH(CH_2CH_2OH)_3$.

Examples of the amphoteric surfactants include, but are not limited to, laurylaminopropionate, lauryl dimethyl betaine, stearyl dimethyl betaine, and lauryl hydroxyethyl betaine.

Examples of the nonionic surfactants include, but are not limited to, polyoxyethylene alkyl phenyl ethers, polyoxyethylene alkyl esters, polyoxyethylene alkylamines, polyoxyethylene alkylamides, polyoxyethylene propylene block polymers, sorbitan fatty acid esters, polyoxyethylene sorbitan fatty acid esters, and ethylene oxide adducts of acetylene alcohol.

A content of the surfactant in the ink is not particularly limited and may be appropriately selected according to a purpose, but is preferably 0.001% by mass or more and 5% by mass or less, and more preferably 0.05% by mass or more and 5% by mass or less, with respect to the total amount of the ink, from the viewpoint of excellent wettability, discharge stability, and improved image quality.

—Defoaming Agent—

The defoaming agent is not particularly limited, and examples of the defoaming agent include, but are not limited to, silicone-based defoaming agents, polyether-based defoaming agents, and fatty acid ester-based defoaming agents. Among these defoaming agents, silicone-based defoaming agents have excellent defoaming ability, and thus are preferred. Each of these defoaming agents can be used alone or in combination with others.

—Preservative/Antifungal Agent—

The preservative/antifungal agent in the ink is not particularly limited, and examples thereof include, but are not limited to, 1,2-benzisothiazolin-3-one.

—Rust Inhibitor—

The rust inhibitor in the ink is not particularly limited, and examples thereof include, but are not limited to, acidic sulfites and sodium thiosulfate.

—pH Adjuster—

The pH adjuster in the ink is not particularly limited as long as the pH adjuster adjusts the pH to 7 or higher. Examples of the pH adjuster include, but are not limited to, amines such as diethanolamine and triethanolamine.

—Physical Properties of Ink—

The physical properties of the ink are not particularly limited and may be appropriately selected according to a purpose. For example, the viscosity, the surface tension, and pH are preferably within the following ranges.

The viscosity of the ink at 25° C. is preferably 5 mPa s or more and 30 mPa s or less, and more preferably 5 mPa s or more and 25 mPa s or less, from the viewpoint of improving the printing density and the character quality and obtaining good discharge properties.

Here, the viscosity can be measured using a rotational viscometer (RE-80L, manufactured by TOKI SANGYO).

Regarding the measurement conditions, the viscosity may be measured at 25° C. with a standard cone rotor (1° 34'×R24), a sample liquid amount of 1.2 mL, a rotation speed of 50 rpm, and a measurement time of 3 minutes.

Preferably, the surface tension of the ink at 25° C. is 35 mN/m or less, and more preferably 32 mN/m or less, so that the ink is suitably leveled on a recording medium and the drying time of the ink is shortened.

The pH of the ink is preferably from 7 to 12, and more preferably from 8 to 11, from the viewpoint of preventing corrosion of metal members in contact with the liquid.

Examples of methods for qualitatively and quantitatively measuring the organic solvent, the resin, the color material, and other components contained in the ink include, but are not limited to, gas chromatography-mass spectrometry (GC-MS). An example of a measurement apparatus used for gas chromatography-mass spectrometry (GC-MS) includes, but is not limited to, GCMS-QP2020NX (manufactured by Shimadzu Corporation).

The amount of water contained in the ink can be measured by quantification of volatile components by gas chromatography-mass spectrometry (GC-MS), or mass variation by thermogravimetry-differential thermal analysis (TG-DTA), as general methods.

<Printed Object>

A printed object according to the present embodiment includes an image formed on a recording medium by using the printing set of the present embodiment. The printed object may be obtained by printing an image on a recording medium using the printing apparatus and the printing method of the present embodiment.

<Recording Medium>

The recording medium is not particularly limited. For example, plain paper, glossy paper, special purpose paper, and cloth can be used, and even if a non-permeable recording medium is used, good image formation is possible.

The non-permeable recording medium is a substrate having a surface with low water permeability and absorbency, and also includes materials that have a large number of cavities inside but do not open to the outside. More quantitatively, the non-permeable recording medium is a substrate in which the amount of absorbed water from the start of contact to 30 msec$^{1/2}$ is 10 mL/m$^2$ or less in the Bristow method.

For example, plastic films such as vinyl chloride resin films, polyethylene terephthalate (PET) films, polypropylene films, polyethylene films, and polycarbonate films may be suitably used as the non-permeable recording medium.

Polypropylene and polyethylene films may be appropriately synthesized or may be commercially available products.

Examples of commercially available products of the polypropylene and polyethylene films include, but are not limited to, AR1025, AR1056, AR1082, EC1082, 1082D, 1073D, 1056D, 1025D, and FR1073 (all manufactured by Asahi-DuPont Flashspun Products Co., Ltd.); P2002, P2102, P2108, P2161, P2171, P2111, P4266, P5767, P3162, P6181, P8121, P1162, P1111, P1128, P1181, P1153, P1157, P1146, P1147, P1171 (all manufactured by Toyobo Co., Ltd.); YPI, AQUAYUPO, SUPERYUPO, ULTRAYUPO, NEWYUPO, YUPO illumination paper, YUPO construction paper, YUPO high gloss, YUPO jet, and metallic YUPO (all manufactured by Yupo Corporation). Each of these can be used alone or in combination with others.

(Printing Method and Printing Apparatus)

The printing method of the present embodiment includes a primer application step and an ink application step, and further includes other steps if desired.

The printing apparatus of the present embodiment includes a primer applicator and an ink applicator, and further includes other units if desired.

The printing method of the present embodiment may be suitably implemented by the printing apparatus of the present embodiment, the primer application step may be suitably implemented by the primer applicator, the ink application step may be suitably implemented by the ink applicator, and another step may be suitably implemented by another unit.

Examples of the printing apparatus and the printing method include, but are not limited to, a desktop-type printing apparatus and a wide-width printing apparatus that also prints on a recording medium having AO size, for example, a continuous feed printer that uses a continuous sheet wound in a roll shape as a recording medium.

<Primer Application Step and Primer Applicator>

The primer application step is a step of applying the primer of the present embodiment onto a recording medium, and is implemented by the primer applicator.

The method of applying the primer is not particularly limited and may be appropriately selected according to a purpose. Examples of the method include, but are not limited to, an inkjet method, blade coating, gravure coating, gravure offset coating, bar coating, roll coating, spray coating, knife coating, air knife coating, comma coating, U-comma coating, AKKU coating, smoothing coating, micro gravure coating, reverse roll coating, 4-roll coating, 5-roll coating, dip coating, curtain coating, slide coating, and die coating. Among these methods, the inkjet method is preferable. Application by the inkjet method is preferable, because a material can be applied uniformly over the entire area of the recording medium, and it is possible to apply a minimum necessary amount of the material by adjusting the droplet size.

If desired, the recording medium to which the primer is applied may be heated to dry the primer, but the heating may be omitted.

The amount of primer applied to the recording medium is preferably 1 $g/m^2$ or more and 15 $g/m^2$ or less, and more preferably 3 $g/m^2$ or more and 10 $g/m^2$ or less.

<Ink Application Step and Ink Applicator>

The ink application step is a step of applying, onto the recording medium to which the primer is applied, an ink containing a color material and an organic solvent, and the ink application step is implemented by the ink applicator.

In the present embodiment, the ink is applied after applying the primer onto the recording medium. The ink may be applied before or after drying the primer.

The method of applying the ink is not particularly limited and examples thereof include, but are not limited to, an inkjet method, blade coating, gravure coating, gravure offset coating, bar coating, roll coating, knife coating, air knife coating, comma coating, U-comma coating, AKKU coating, smoothing coating, micro gravure coating, reverse roll coating, 4-roll coating, 5-roll coating, dip coating, curtain coating, slide coating, and die coating. Among these methods, the inkjet method is preferable, from the viewpoint of achieving high maintainability of instruments and work efficiency.

<Other Steps and Other Units>

Other steps are not particularly limited, may be appropriately selected according to a purpose, and examples thereof include, but are not limited to, a heating step and a conveyance step.

Other units are not particularly limited, may be appropriately selected according to a purpose, and examples thereof include, but are not limited to, a heater and a conveyer.

—Heating Step and Heater—

In the printing method of the present embodiment, it is preferable to provide a heating step after the ink application step. Examples of the heater include, but are not limited to, a roll heater, a drum heater, hot air, and a hot plate.

In the heating step, the heat treatment is preferably performed at a temperature of 60° C. or higher and 80° C. or lower in order to obtain a sufficient drying effect and not to damage the recording medium.

The heating time is preferably 10 seconds or more and 10 minutes or less, and more preferably 1 minute or more and 2 minutes or less, in order to obtain a sufficient drying effect and not to damage the recording medium.

Here, an example of the printing apparatus of the present embodiment used for the printing method of the present embodiment will be described in detail with reference to the drawing. The number, position, shape, and the like of the constituent members described below are not limited to those in the present embodiment, and can be set to a preferable number, position, shape, and the like when implementing the present embodiment.

The drawing is a schematic view of the printing apparatus of the present embodiment used in the printing method of the present embodiment.

It is noted that the ink application step and the primer application step in the printing method of the present embodiment may be performed by the same printing apparatus, or may be performed by separate printing apparatuses.

A printing apparatus 100 of the drawing includes a primer applicator 110, an ink applicator 120, a post-treatment liquid applicator 130, a dryer 140, and a conveyer 150. The primer applicator 110 applies a primer to a recording medium M. The primer applicator 110, the post-treatment liquid applicator 130, the dryer 140, and the conveyer 150 may be omitted.

The method of applying the primer is not particularly limited and examples thereof include, but are not limited to, an inkjet method, roller coating, blade coating, gravure coating, gravure offset coating, bar coating, roll coating, knife coating, air knife coating, comma coating, U-comma coating, AKKU coating, smoothing coating, micro gravure coating, reverse roll coating, 4-roll and 5-roll coating, dip coating, curtain coating, slide coating, and die coating.

The printing may be performed by using a printing apparatus after the primer is manually applied to the recording medium in advance by bar coating or the like, and thus, the primer applicator 110 may be omitted.

The recording medium M used for recording is not particularly limited and may be appropriately selected according to a purpose. Examples of the recording medium M include, but are not limited to, plain paper, glossy paper, special paper, cardboard, cloth, a film, an OHP sheet, and general-purpose printing paper.

Embodiments of the present embodiment are particularly effective in a non-permeable recording medium in which beading easily occurs.

The non-permeable recording medium in the present embodiment refers to a recording medium having a surface with low water permeability and absorbency, and also includes materials that have a large number of cavities inside but do not open to the outside.

More quantitatively, the non-permeable recording medium is a recording medium in which the amount of absorbed water from the start of contact to 30 msec$^{1/2}$ is 10 mL/m$^2$ or less in the Bristow method.

For example, vinyl chloride resin films, polyethylene terephthalate (PET) films, polypropylene films, polyethylene films, polycarbonate films, and nylon films may be suitably used as the non-permeable recording medium.

The ink applicator 120 applies ink to a surface of the recording medium M to which the primer is applied.

For example, a known inkjet head may be used as the ink applicator 120.

The ink applicator 120 may be an inkjet head that discharges ink of any color, and may include an inkjet head that discharges yellow (Y), magenta (M), cyan (C), black (K), and white (W) ink, if desired.

The primer may be discharged from a part of the head that discharges the ink. In this case, the primer applicator 110 may be omitted.

It is preferable that the post-treatment liquid applicator 130 applies a post-treatment liquid to a region of the surface of the recording medium M where the ink is applied. For example, other than the inkjet head, a spray or a roller may be used in the post-treatment liquid applicator 130. The post-treatment liquid applicator 130 may be omitted.

The method of applying the post-treatment liquid is not particularly limited and examples thereof include, but are not limited to, an inkjet method, roller coating, blade coating, gravure coating, gravure offset coating, bar coating, roll coating, knife coating, air knife coating, comma coating, U-comma coating, AKKU coating, smoothing coating, micro gravure coating, reverse roll coating, 4-roll and 5-roll coating, dip coating, curtain coating, slide coating, and die coating.

The dryer 140 uses hot air to dry the recording medium M to which the post-treatment liquid is applied. The dryer 140 may be omitted if no post-treatment liquid applicator is used.

Instead of hot air, the dryer 140 may use infrared rays, microwaves, a roll heater, and the like to heat and dry the recording medium M to which the post-treatment liquid is applied, or the recording medium M to which the post-treatment liquid is applied may be dried naturally without operating the dryer 140.

The conveyer 150 conveys the recording medium M. The conveyer 150 is not particularly limited as long as the conveyer 150 conveys the recording medium M, and may be appropriately selected according to a purpose. Examples of the conveyer 150 include, but are not limited to, a conveyance belt and a platen.

The printing apparatus 100 may further include a fixer that heats and fixes an image formed on the recording medium M. The fixer is not particularly limited, may be appropriately selected according to a purpose, and examples thereof include, but are not limited to, a fixing roller.

Additionally, when a desktop-type printer is used as the printing apparatus, the primer applicator and the post-treatment liquid applicator may include respective liquid discharge heads and liquid accommodation containers respectively including a primer and a post-treatment liquid, so that the primer and the post-treatment liquid are discharged by an inkjet recording method, in the same manner as ink such as K (black), C (cyan), M (magenta), Y (yellow), and W (white) ink.

In the present disclosure, the terms "image formation", "recording", "character printing", and "printing" may be used synonymously with each other.

In the present disclosure, the terms "recording medium", "medium", and "object to be printed" may be used synonymously with each other.

EXAMPLES

Examples according to the present embodiment will be described below, but the present embodiment is in no way limited to such examples.

Preparation Examples 1 to 31

<Preparation of Primer>

The components and contents illustrated in Tables 1-1 to 1-4 were mixed and stirred, and filtered through a filter having an average pore size of 10 μm (MINISART, manufactured by Sartorius Group) to prepare primers of Examples 1 to 31. All contents of the components of the primers in Tables 1-1 to 1-4 are expressed in % by mass, and the content of SUPERFLEX 650 is expressed in terms of solid content.

TABLE 1-1

| | | Preparation Examples | | | | | | | |
|---|---|---|---|---|---|---|---|---|---|
| | | 1 | 2 | 3 | 4 | 5 | 6 | 7 | 8 |
| Diethylene glycol alkyl ethers | Diethylene glycol diethyl ether | 20 | 20 | 20 | 20 | 20 | 20 | 20 | 20 |
| | Diethylene glycol dimethyl ether | — | — | — | — | — | — | — | — |
| Polyvalent metal salts | Magnesium acetate tetrahydrate | 2 | 5 | 2 | 5 | 2 | 5 | 2 | 5 |
| | Magnesium nitrate hexahydrate | — | — | — | — | — | — | — | — |

TABLE 1-1-continued

| | | Preparation Examples | | | | | | | |
|---|---|---|---|---|---|---|---|---|---|
| | | 1 | 2 | 3 | 4 | 5 | 6 | 7 | 8 |
| Cationic resin | SUPERFLEX 650 | 7 | 7 | 12 | 12 | 5 | 5 | 13 | 13 |
| Other components | Propylene glycol | 15 | 15 | 15 | 15 | 15 | 15 | 15 | 15 |
| | 3-Methoxy-3-methyl-1-butanol | 10 | 10 | 10 | 10 | 10 | 10 | 10 | 10 |
| | SAG503A | 0.5 | 0.5 | 0.5 | 0.5 | 0.5 | 0.5 | 0.5 | 0.5 |
| | PROXEL LV | 0.01 | 0.01 | 0.01 | 0.01 | 0.01 | 0.01 | 0.01 | 0.01 |
| Water | Ion-exchanged water | Rest | Rest | Rest | Rest | Rest | Rest | Rest | Rest |
| | Total (mass %) | 100 | 100 | 100 | 100 | 100 | 100 | 100 | 100 |

15

TABLE 1-2

| | | Preparation Examples | | | | | | | |
|---|---|---|---|---|---|---|---|---|---|
| | | 9 | 10 | 11 | 12 | 13 | 14 | 15 | 16 |
| Diethylene glycol alkyl ethers | Diethylene glycol diethyl ether | 20 | 20 | 20 | 20 | 5.5 | 5.5 | 5.5 | 5.5 |
| | Diethylene glycol dimethyl ether | — | — | — | — | — | — | — | — |
| Polyvalent metal salts | Magnesium acetate tetrahydrate | 1 | 7 | 1 | 7 | 0.25 | 10 | 0.25 | 10 |
| | Magnesium nitrate hexahydrate | — | — | — | — | — | — | — | — |
| Cationic resin | SUPERFLEX 650 | 7 | 7 | 12 | 12 | 2 | 2 | 15 | 15 |
| Other components | Propylene glycol | 15 | 15 | 15 | 15 | 15 | 15 | 15 | 15 |
| | 3-Methoxy-3-methyl-1-butanol | 10 | 10 | 10 | 10 | 10 | 10 | 10 | 10 |
| | SAG503A | 0.5 | 0.5 | 0.5 | 0.5 | 0.5 | 0.5 | 0.5 | 0.5 |
| | PROXEL LV | 0.01 | 0.01 | 0.01 | 0.01 | 0.01 | 0.01 | 0.01 | 0.01 |
| Water | Ion-exchanged water | Rest | Rest | Rest | Rest | Rest | Rest | Rest | Rest |
| | Total (mass %) | 100 | 100 | 100 | 100 | 100 | 100 | 100 | 100 |

TABLE 1-3

| | | Preparation Examples | | | | | | | |
|---|---|---|---|---|---|---|---|---|---|
| | | 17 | 18 | 19 | 20 | 21 | 22 | 23 | 24 |
| Diethylene glycol alkyl ethers | Diethylene glycol diethyl ether | 30 | 30 | 30 | 30 | — | 4.5 | 5.0 | 30.5 |
| | Diethylene glycol dimethyl ether | — | — | — | — | 5 | | | |
| Polyvalent metal salts | Magnesium acetate tetrahydrate | 0.25 | 10 | 0.25 | 10 | 0.25 | 0.25 | 0.25 | 0.25 |
| | Magnesium nitrate hexahydrate | — | — | — | — | — | — | — | — |
| Cationic resin | SUPERFLEX 650 | 2 | 2 | 15 | 15 | 12 | 12 | 12 | 12 |
| Other components | Propylene glycol | 15 | 15 | 15 | 15 | 15 | 15 | 15 | 15 |
| | 3-Methoxy-3-methyl-1-butanol | 10 | 10 | 10 | 10 | 10 | 10 | 10 | 10 |
| | SAG503A | 0.5 | 0.5 | 0.5 | 0.5 | 0.5 | 0.5 | 0.5 | 0.5 |
| | PROXEL LV | 0.01 | 0.01 | 0.01 | 0.01 | 0.01 | 0.01 | 0.01 | 0.01 |
| Water | Ion-exchanged water | Rest | Rest | Rest | Rest | Rest | Rest | Rest | Rest |
| | Total (mass %) | 100 | 100 | 100 | 100 | 100 | 100 | 100 | 100 |

TABLE 1-4

| | | Preparation Examples | | | | | | |
|---|---|---|---|---|---|---|---|---|
| | | 25 | 26 | 27 | 28 | 29 | 30 | 31 |
| Diethylene glycol alkyl ethers | Diethylene glycol diethyl ether | 14.5 | 15 | 20 | 20 | 20 | 20 | 20 |
| | Diethylene glycol dimethyl ether | — | — | — | — | — | — | — |
| Polyvalent metal salts | Magnesium acetate tetrahydrate | 0.25 | 0.25 | — | 0.25 | 0.25 | 0.1 | 10.5 |
| | Magnesium nitrate hexahydrate | — | — | 0.25 | — | — | — | — |
| Cationic resin | SUPERFLEX 650 | 12 | 12 | 12 | 1.5 | 15.5 | 12 | 12 |
| Other components | Propylene glycol | 15 | 15 | 15 | 15 | 15 | 15 | 15 |
| | 3-Methoxy-3-methyl-1-butanol | 10 | 10 | 10 | 10 | 10 | 10 | 10 |
| | SAG503A | 0.5 | 0.5 | 0.5 | 0.5 | 0.5 | 0.5 | 0.5 |
| | PROXEL LV | 0.01 | 0.01 | 0.01 | 0.01 | 0.01 | 0.01 | 0.01 |
| Water | Ion-exchanged water | Rest | Rest | Rest | Rest | Rest | Rest | Rest |
| | Total (mass %) | 100 | 100 | 100 | 100 | 100 | 100 | 100 |

The components in Tables 1-1 to 1-4 are described in detail below.

SAG503A (siloxane surfactant, HLB value=11, manufactured by Nissin Chemical Co., Ltd.)

PROXEL LV (preservative, manufactured by Avecia Inc.)

SUPERFLEX 650 (urethane-based cationic resin particles, non-volatile content of 26%, manufactured by Daiichi Kogyo Seiyaku Co., Ltd.)

Preparation Examples 32 to 36

<Preparation of Primer>

Primers of Preparation Examples 32 to 36 were prepared similarly to Preparation Examples 1 to 31, except that the components and contents of Preparation Examples 1 to 31 were changed to those illustrated in Table 2. All contents of the components of the primers in Table 2 are in % by mass, and the contents of SUPERFLEX 650 and SUPERFLEX 126 are in terms of solid content.

The components in Table 2 are described in detail below.

SAG503A (siloxane surfactant, BILB value=11, manufactured by Nissin Chemical Co., Ltd.)

PROXEL LV (preservative, manufactured by Avecia Inc.)

SUPERFLEX 650 (urethane-based cationic resin particles, non-volatile content of 26%, manufactured by Daiichi Kogyo Seiyaku Co., Ltd.)

SUPERFLEX 126 (urethane-based anionic resin particles, non-volatile content of 3000, manufactured by Daiichi Kogyo Seiyaku Co., Ltd.)

Preparation Example of Pigment Dispersion

<Preparation of Black Pigment Dispersion>

100 g of SRF-LS (carbon black, manufactured by Tokai Carbon Co., Ltd.) was added to 3,000 mL of a 2.5 N (standard) sodium hypochlorite solution, stirred at a temperature of 60° C. and a speed of 300 rpm, and reacted for 10 hours in an oxidation treatment to obtain a reaction liquid

TABLE 2

| | | Preparation Examples | | | | |
|---|---|---|---|---|---|---|
| | | 32 | 33 | 34 | 35 | 36 |
| Diethylene glycol alkyl ether | Diethylene glycol diethyl ether | — | — | — | 5.5 | 5.5 |
| Comparative components | Triethylene glycol monobutyl ether | 5.5 | — | — | — | — |
| | Ethyl acerate | — | 5.5 | — | — | — |
| | γ-Butyrolactone | — | — | 5.5 | — | — |
| Polyvalent metal salt | Magnesium acetate tetrahydrate | 0.25 | 0.25 | 0.25 | 0.25 | — |
| Comparative component | Sodium acetate | — | — | — | — | 0.25 |
| Cationic resin | SUPERFLEX 650 | 2 | 2 | 2 | — | 2 |
| Comparative component | SUPERFLEX 126 | — | — | — | 2 | — |
| Other components | Propylene glycol | 15 | 15 | 15 | 15 | 15 |
| | 3-Methoxy-3-methyl-1-butanol | 10 | 10 | 10 | 10 | 10 |
| | SAG503A | 0.5 | 0.5 | 0.5 | 0.5 | 0.5 |
| | PROXEL LV | 0.01 | 0.01 | 0.01 | 0.01 | 0.01 |
| Water | Ion-exchanged water | Rest | Rest | Rest | Rest | Rest |
| | Total (mass %) | 100 | 100 | 100 | 100 | 100 |

23 containing a pigment in which a carboxylic acid group is attached to a surface of carbon black.

The reaction liquid was filtered, and the carbon black separated by filtration was neutralized by using a sodium hydroxide solution and subjected to ultrafiltration.

Subsequently, the filtered carbon black and ion-exchanged water were subjected to an ultrafiltration using a dialysis membrane. Further, the obtained mixture was subjected to ultrasonic dispersion to obtain a black pigment dispersion having a volume average particle diameter of 100 nm, in which the solid content of the pigment was concentrated to 20% by mass.

Ink Preparation Example 1

<Preparation of Black Ink>

The components and contents illustrated in Table 3 were mixed and stirred and the obtained mixture was filtered through a polypropylene filter having an average pore size of 0.2 m, to prepare black ink 1. In Table 3, all contents of the components of the black ink are expressed in % by mass, and the content of VONCOAT CP-6450 is expressed in terms of solid content.

TABLE 3

|  | Black ink 1 |
| --- | --- |
| VONCOAT CP-6450 | 10 |
| Black pigment dispersion | 5 |
| Propylene glycol | 30 |
| Diethylene glycol monobutyl ether | 5 |
| FS-300 | 0.5 |
| Ion-exchanged water | Rest |
| Total (mass %) | 100 |

The components in Table 3 are described in detail below.

VONCOAT CP-6450 (acrylic resin emulsion, manufactured by DIC Corporation, solid content concentration of 40%)

FS-300 (fluorine-based surfactant, manufactured by DuPont)

Examples 1 to 31 and Comparative Examples 1 to 5

<Formation of Solid Image>

Based on the combinations illustrated in Tables 4-1 to 4-5, the primers of Preparation Examples 1 to 31 and Preparation Examples 32 to 36 and the black ink 1 prepared as described above were filled into an inkjet printer (device name: IPSiO GXe5500 modified device, manufactured by Ricoh Co., Ltd.).

Subsequently, a solid image of the primers was printed on a polyvinyl chloride sheet (GIY-11Z5, manufactured by Lintec Corporation, hereinafter referred to as "PVC sheet"), so that an adhesion amount of the primer was 4.2 g/m$^2$.

Within 10 minutes after printing the solid image of the primer alone, a solid image of the black ink 1 prepared as described above was printed in a superimposed manner on the solid image of the primer alone, and then, the solid image of the black ink 1 was dried at 80° C. for 3 minutes.

Subsequently, each of the obtained solid image was evaluated regarding "fixability (beading)", "glossiness", "adhesion", and "ethanol resistance" as described below. The results are illustrated in Tables 4-1 to 4-5.

<Fixability (Beading)>

The solid image of the primer alone formed on the PVC sheet and the solid ink image were visually observed to evaluate whether beading occurs, and the "fixability (beading)" was evaluated, based on the following evaluation criteria. For practical use, a beading evaluation result of "A" or higher is desirable. Here, beading refers to a phenomenon in which adjacent dots are connected on a recording medium, resulting in irregular gaps, an increase in density, and the like, which impairs image quality.

[Evaluation Criteria]

AA: No beading observed

A: Some slight beading observed

B: Slight beading observed

C: Beading observed

<Adhesion>

The solid ink image formed on the PVC sheet was subjected to a cross-cut test (JIS K5600-5-6) using an adhesive cloth tape (123LW-50, manufactured by Nichiban Co., Ltd.), and the number of remaining squares among 100 test squares was counted, to evaluate the "adhesion" to the PVC sheet, based on the following evaluation criteria. For practical use, an adhesion evaluation result of "B" or higher is desirable.

[Evaluation Criteria]

AA: 96 or more remaining squares

A: 90 or more and less than 96 remaining squares

B: 70 or more and less than 90 remaining squares

C: Less than 70 remaining squares

<Glossiness>

The 60° gloss of the solid ink image formed on the PVC film was measured four times by using a gloss meter (4501, manufactured by BYK Gardener Co., Ltd.), to determine an average value of the gloss, and the "glossiness" was evaluated, based on the following evaluation criteria. For practical use, a glossiness evaluation result of "B" or higher is desirable.

[Evaluation Criteria]

A: Gloss of 90 or more

B: Gloss of 80 or more and less than 90

C: Gloss less than 80

<Ethanol Resistance>

The surface of the solid ink image was lightly wiped five times in one direction by using a KANAKIN No. 3 cotton cloth soaked in 95% by mass ethanol, and then, after 5 minutes, a surface change in the solid ink image was visually observed, and the "ethanol resistance" was evaluated, based on the following evaluation criteria. For practical use, an evaluation result of the ethanol resistance of "B" or higher is desirable.

[Evaluation Criteria]

A: No discoloration or peeling on image surface

B: No peeling on image surface

C: Peeling on image surface

TABLE 4-1

| | | Examples | | | | | | | |
|---|---|---|---|---|---|---|---|---|---|
| | | 1 | 2 | 3 | 4 | 5 | 6 | 7 | 8 |
| | Primer Preparation Example | 1 | 2 | 3 | 4 | 5 | 6 | 7 | 8 |
| | Black ink 1 | 1 | 1 | 1 | 1 | 1 | 1 | 1 | 1 |
| Evaluations | Beading (ink on primer) | AA | AA | AA | AA | A | A | A | A |
| | Beading (primer alone) | AA | AA | AA | AA | AA | AA | AA | AA |
| | Glossiness | A | A | A | A | A | A | A | A |
| | Adhesion | AA | AA | AA | AA | AA | AA | AA | AA |
| | Ethanol resistance | A | A | A | A | A | A | A | A |

TABLE 4-2

| | | Examples | | | | | | | |
|---|---|---|---|---|---|---|---|---|---|
| | | 9 | 10 | 11 | 12 | 13 | 14 | 15 | 16 |
| | Primer Preparation Example | 9 | 10 | 11 | 12 | 13 | 14 | 15 | 16 |
| | Black ink 1 | 1 | 1 | 1 | 1 | 1 | 1 | 1 | 1 |
| Evaluations | Beading (ink on primer) | A | A | A | A | A | A | A | A |
| | Beading (primer alone) | AA | AA | AA | AA | AA | AA | AA | AA |
| | Glossiness | A | A | A | A | A | A | B | B |
| | Adhesion | A | A | A | A | A | B | A | B |
| | Ethanol resistance | A | A | A | A | B | A | A | A |

TABLE 4-3

| | | Examples | | | | | | | |
|---|---|---|---|---|---|---|---|---|---|
| | | 17 | 18 | 19 | 20 | 21 | 22 | 23 | 24 |
| | Primer Preparation Example | 17 | 18 | 19 | 20 | 21 | 22 | 23 | 24 |
| | Black ink 1 | 1 | 1 | 1 | 1 | 1 | 1 | 1 | 1 |
| Evaluations | Beading (ink on primer) | A | A | A | A | A | A | A | A |
| | Beading (primer alone) | AA | AA | AA | AA | A | A | AA | AA |
| | Glossiness | A | A | B | B | B | B | B | B |
| | Adhesion | A | B | A | B | A | B | B | B |
| | Ethanol resistance | B | A | A | A | B | A | A | B |

TABLE 4-4

| | | Examples | | | | | | |
|---|---|---|---|---|---|---|---|---|
| | | 25 | 26 | 27 | 28 | 29 | 30 | 31 |
| | Primer Preparation Example | 25 | 26 | 27 | 28 | 29 | 30 | 31 |
| | Black ink 1 | 1 | 1 | 1 | 1 | 1 | 1 | 1 |
| Evaluations | Beading (ink on primer) | A | A | A | A | A | A | A |
| | Beading (primer alone) | A | AA | AA | AA | AA | AA | AA |
| | Glossiness | A | A | B | A | B | A | B |
| | Adhesion | A | A | B | B | A | B | A |
| | Ethanol resistance | A | A | B | B | A | B | A |

TABLE 4-5

| | | Comparative Examples | | | | |
|---|---|---|---|---|---|---|
| | | 1 | 2 | 3 | 4 | 5 |
| | Primer Preparation Example | 32 | 33 | 34 | 35 | 36 |
| | Black ink 1 | 1 | 1 | 1 | 1 | 1 |
| Evaluations | Beading (ink on primer) | B | C | C | C | C |
| | Beading (primer alone) | B | C | C | C | C |
| | Glossiness | B | B | B | C | B |
| | Adhesion | B | A | C | B | B |
| | Ethanol resistance | C | C | C | B | A |

From the results in Tables 4-1 to 4-5, the following was found.

Examples 1 to 4 are the most preferable forms of the present embodiment, and it was found that the suppression of beading in the ink image was excellent and an image having excellent glossiness, adhesion, and ethanol resistance was obtained.

Examples 5 to 8 are more preferred forms of the present embodiment, and even though the suppression of beading in the ink image is slightly inferior to that of Examples 1 to 4, desirable results in terms of image quality were obtained.

Examples 9 to 12 are more preferred forms of the present embodiment, and even though the adhesion of the ink image is slightly inferior to that of Examples 5 to 8, desirable results in terms of image quality were obtained.

Examples 13 to 20 are preferred forms of the present embodiment, and are slightly inferior to Examples 5 to 12 in one or more characteristics including glossiness, adhesion, and ethanol resistance of the ink image, but sufficiently favorable results were obtained in terms of the image quality.

Example 21 is an example in which diethylene glycol alkyl ether and diethylene glycol dimethyl ether were used, and the results indicated that Example 21 was slightly inferior to Examples 9 to 12 in one or more characteristics including the suppression of beading in the image of the primer alone, the glossiness of the ink image, and ethanol resistance.

Example 22 is an example in which less than 5% by mass of diethylene glycol alkyl ether were used, and the results indicated that Example 22 was slightly inferior to Examples 9 to 12 in one or more characteristics including the suppression of beading in the image of the primer alone, the glossiness of the ink image, and adhesion.

Example 23 is an example in which 5% by mass of diethylene glycol alkyl ether were used, and the results indicated that Example 23 was slightly inferior to Examples 9 to 12 in one or more characteristics including the glossiness of the ink image and adhesion, and was superior to Example 22 in suppression of beading in the image of the primer alone.

Example 24 is an example in which more than 30% by mass of diethylene glycol alkyl ether were used, and the results indicated that Example 24 was slightly inferior to Examples 9 to 12 in one or more of the characteristics including glossiness, adhesion, and ethanol resistance of the ink image.

Example 25 is an example in which less than 15% by mass of diethylene glycol diethyl ether were used, and the results indicated that Example 25 was slightly inferior to Examples 9 to 12 in suppressing beading of the image of the primer alone.

Example 26 is an example in which 15% by mass of diethylene glycol diethyl ether were used, and the results indicated that Example 26 was equivalent to Examples 9 to 12, and superior to Example 25 in suppressing beading of the image of the primer alone.

Example 27 is an example in which magnesium nitrate was used as a polyvalent metal salt, and the results indicated that Example 27 was slightly inferior to Examples 9 to 12 in one or more of the characteristics including glossiness, adhesion, and ethanol resistance of the ink image.

Example 28 is an example in which a cationic resin was used in an amount of less than 2% by mass, and the results indicated that Example 28 was slightly inferior to Examples 9 to 12 in one or more of the characteristics including adhesion and ethanol resistance of the ink image.

Example 29 is an example in which the cationic resin was used in an amount of more than 15% by mass, and the results indicated that the glossiness of the ink image was slightly inferior to that of Examples 9 to 12.

Example 30 is an example in which magnesium acetate was used in an amount of less than 0.25% by mass, and the results indicated that Example 30 was slightly inferior to Examples 9 to 12 in one or more of the characteristics including adhesion and ethanol resistance of the ink image.

Example 31 is an example in which magnesium acetate was used in an amount of more than 10% by mass, and the results indicated that the glossiness of the ink image was slightly inferior to that of Examples 9 to 12.

Comparative Example 1 is an example in which no diethylene glycol alkyl ether was used and triethylene glycol monobutyl ether was used instead. The results indicated that Comparative Example 1 was inferior to the Examples in fixability, glossiness, adhesion, and ethanol resistance of the ink image.

Comparative Example 2 is an example in which no diethylene glycol alkyl ether was used and ethyl acetate was used instead. The results indicated that Comparative Example 2 was inferior to the Examples in fixability, glossiness, and ethanol resistance of the ink image.

Comparative Example 3 is an example in which no diethylene glycol alkyl ether was used and γ-butyrolactone was used instead. The results indicated that Comparative Example 3 was inferior to the Examples in fixability, adhesion, and ethanol resistance of the ink image.

Comparative Example 4 is an example in which no cationic resin was used and the anionic resin SUPERFLEX 126 was used instead. The results indicated that Comparative Example 4 was inferior to the Examples in fixability, glossiness, adhesion, and ethanol resistance of the ink image.

Comparative Example 5 is an example in which no polyvalent metal salt was used and sodium acetate, which is a monovalent metal salt, was used instead. The results indicated that Comparative Example 5 was inferior to the Examples in fixability, glossiness, and adhesion of the ink image.

For example, aspects of the present embodiment include the following.

In a first aspect, a primer contains water, a cationic resin, a polyvalent metal salt, and a diethylene glycol alkyl ether-based organic solvent.

According to a second aspect, in the primer according to the first aspect, the diethylene glycol alkyl ether-based organic solvent includes diethylene glycol diethyl ether.

According to a third aspect, in the primer according to any one of the first and second aspects, a content of the diethylene glycol alkyl ether-based organic solvent in the primer is 5% by mass or more and 30% by mass or less.

According to a fourth aspect, in the primer according to the third aspect, the content of the diethylene glycol alkyl ether-based organic solvent in the primer is 15% by mass or more and 30% by mass or less.

According to a fifth aspect, in the primer according to any one of the first and second aspects, the polyvalent metal salt includes magnesium acetate.

According to a sixth aspect, in the primer according to any one of the first and second aspects, a content of the polyvalent metal salt in the primer is 0.25% by mass or more and 10% by mass or less.

According to a seventh aspect, in the primer according to any one of the first and second aspects, a content of the cationic resin in the primer is 2% by mass or more and 15% by mass or less.

According to an eighth aspect, a printing set includes:

the primer according to any one of the first and second aspects, and an ink containing a color material and an organic solvent.

According to a ninth aspect, a printing method includes:

applying the primer according to any one of the first and second aspects onto a recording medium, and applying an ink containing a color material and an organic solvent onto the recording medium to which the primer is applied.

According to a tenth aspect, in the printing method according to the ninth aspect, the recording medium includes a non-permeable recording medium.

According to an eleventh aspect, a printing apparatus includes:

a recording medium;

a primer applicator to apply the primer according to any one of the first and second aspects onto a recording medium, and an ink applicator to apply an ink containing a color material and an organic solvent onto the recording medium to which the primer is applied.

According to a twelfth aspect, in the printing apparatus according to the eleventh aspect, the recording medium includes a non-permeable recording medium.

According to the primer according to any one of the first to seventh aspects, the printing set according to the eighth aspect, the printing method according to any one of the ninth and tenth aspects, and the printing apparatus according to any one of the eleventh and twelfth aspects, it is possible to solve various problems of the related art and achieve the object of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A system comprising a primer and a recording material, wherein the primer comprises:

water;

a cationic resin;

a polyvalent metal salt;

a diethylene glycol alkyl ether-based organic solvent, and 3-methoxy-3-methyl-1-butanol, wherein a content of the polyvalent metal salt in the primer is 0.25% by mass or more and 10% by mass or less, and wherein a content of the cationic resin in the primer is 2% by mass or more and 15% by mass or less, and wherein the recording material comprises a non-permeable recording material.

2. The system according to claim 1, wherein the diethylene glycol alkyl ether-based organic solvent comprises diethylene glycol diethyl ether.

3. The system according to claim 1, wherein a content of the diethylene glycol alkyl ether-based organic solvent in the primer is 5% by mass or more and 30% by mass or less.

4. The system according to claim 3, wherein the content of the diethylene glycol alkyl ether-based organic solvent in the primer is 15% by mass or more and 30% by mass or less.

5. The system according to claim 1, wherein the polyvalent metal salt comprises magnesium acetate.

6. A printing set comprising:

the system according to claim 1; and an ink including a color material and an organic solvent.

7. A printing method comprising:

applying the primer according to claim 1 onto the recording medium; and applying an ink including a color material and an organic solvent onto the recording medium to which the primer is applied.

8. A printing apparatus comprising:

a recording medium;

a primer applicator to apply the primer according to claim 1 onto the recording medium; and an ink applicator to apply an ink including a color material and an organic solvent onto the recording medium to which the primer is applied, wherein the recording medium includes a non-permeable recording medium.

9. The system according to claim 2, wherein the polyvalent metal salt comprises magnesium acetate.

10. The system according to claim 9, wherein the content of the diethylene glycol alkyl ether-based organic solvent in the primer is 15% by mass or more and 30% by mass or less.

11. The system according to claim 1, wherein the content of the polyvalent metal salt in the primer is 2.0% by mass or more and 5% by mass or less.

12. The system according to claim 1, wherein the cationic resin is a urethane-based resin, olefin-based resin, or allylamine-based resin.

13. The system according to claim 12, wherein a content of the cationic resin in the primer is 7% by mass or more and 12% by mass or less.

14. The system according to claim 1, wherein the polyvalent metal salt comprises magnesium acetate tetrahydrate.

15. The system according to claim 1, wherein the cationic resin is a urethane-based resin.

16. The system according to claim 15, wherein the diethylene glycol alkyl ether-based organic solvent comprises diethylene glycol diethyl ether.

17. The system according to claim 16, wherein the polyvalent metal salt comprises magnesium acetate.

18. The system according to claim 17, wherein the primer further comprises propylene glycol and a siloxane surfactant.

19. The system according to claim 1, wherein the non-permeable recording medium is a vinyl chloride resin film, a polyethylene terephthalate film, a polypropylene film, a polyethylene film, or a polycarbonate film.

20. The system according to claim 18, wherein the non-permeable recording medium is a polyvinyl chloride sheet.

* * * * *